(12) United States Patent
Cox

(10) Patent No.: US 12,194,791 B2
(45) Date of Patent: Jan. 14, 2025

(54) RAPID-DEFLATE VALVE STEM AND ASSOCIATED SYSTEMS AND METHODS

(71) Applicant: Christopher Cox Creative, Park City, UT (US)

(72) Inventor: Christopher Paul Cox, Park City, UT (US)

(73) Assignee: Christopher Cox Creative, Park City, UT (US)

( * ) Notice: Subject to any disclaimer, the term of this patent is extended or adjusted under 35 U.S.C. 154(b) by 816 days.

(21) Appl. No.: 17/362,526

(22) Filed: Jun. 29, 2021

(65) Prior Publication Data

US 2021/0402835 A1 Dec. 30, 2021

Related U.S. Application Data

(60) Provisional application No. 63/045,476, filed on Jun. 29, 2020.

(51) Int. Cl.
| | |
|---|---|
| *B60C 29/00* | (2006.01) |
| *B60C 23/04* | (2006.01) |
| *B60C 29/02* | (2006.01) |
| *B60C 29/06* | (2006.01) |

(52) U.S. Cl.
CPC ........ *B60C 29/002* (2013.01); *B60C 23/0494* (2013.01); *B60C 29/005* (2013.01); *B60C 29/02* (2013.01); *B60C 29/066* (2013.01)

(58) Field of Classification Search
CPC ..... B69C 29/002; B69C 29/02; B69C 29/066; B69C 29/068; B69C 29/005; Y10T 137/3584–3786; Y10T 137/7771–778

USPC ............................ 137/223–234.5, 493–493.9
See application file for complete search history.

(56) References Cited

U.S. PATENT DOCUMENTS

| 1,004,986 A | * | 10/1911 | Burkett | ................... F16K 15/20 220/231 |
| 1,006,159 A | * | 10/1911 | Wetherholt | ............. B60S 5/043 137/538 |
| 1,144,499 A | * | 6/1915 | Owens et al. | .......... B60S 5/043 137/224 |

(Continued)

OTHER PUBLICATIONS

International Search Report and Written Opinion received for counterpart International Application No. PCT/US21/39666 mailed Nov. 10, 2021 (16 pages).

*Primary Examiner* — William M McCalister
(74) *Attorney, Agent, or Firm* — Christensen O'Connor Johnson Kindness PLLC

(57) ABSTRACT

A valve stem for controlling inflation and deflation is provided. The valve stem includes a valve body having a central passage and a lateral port venting to the atmosphere. A valve core can be positioned within the central passage and configured to permit gas flow into the central passage. A collar is configured to surround an intermediate portion of the valve body, with the collar movable between a first position, where the collar occludes the lateral port to prohibit gas flow out of the lateral port, and a second position, where the collar opens the lateral port to permit gas flow from the central passage through the lateral port. A pressure set assembly can couple to the valve body and be set to a pressure at which the pressure set assembly closes to prohibit gas flow through the pressure set assembly and through the lateral port.

16 Claims, 14 Drawing Sheets

(56) References Cited

U.S. PATENT DOCUMENTS

| | | | | |
|---|---|---|---|---|
| 1,156,328 A * | 10/1915 | Thayer | F16K 15/20 | 137/226 |
| 1,175,208 A * | 3/1916 | Vosler | B60S 5/043 | 137/542 |
| 1,488,813 A * | 4/1924 | Hagen | B60C 23/0496 | 137/226 |
| 2,017,978 A * | 10/1935 | Lapp | B60C 23/0496 | 137/233 |
| 2,473,912 A | 6/1949 | Schwinn | | |
| 2,954,796 A * | 10/1960 | Marshall | F16K 15/207 | 137/539 |
| 3,426,787 A * | 2/1969 | Fuller | B60C 23/0496 | 137/232 |
| 3,450,147 A * | 6/1969 | Webb | B60C 23/0496 | 137/230 |
| 3,491,786 A * | 1/1970 | Bermingham | F16K 15/207 | 137/102 |
| 3,631,886 A * | 1/1972 | Heiden | B60C 29/068 | 137/493.6 |
| 3,967,635 A * | 7/1976 | Sealfon | F16K 11/105 | 137/512.2 |
| 4,015,624 A * | 4/1977 | Wanstreet | F16K 15/20 | 137/232 |
| 4,046,163 A * | 9/1977 | Novak | B60C 29/06 | 137/512.5 |
| 4,869,306 A * | 9/1989 | Keys | B60C 29/06 | 152/428 |
| 5,054,511 A * | 10/1991 | Tuan | B60C 23/0496 | 137/224 |
| 5,665,908 A | 9/1997 | Burkey et al. | | |
| 5,694,969 A * | 12/1997 | DeVuyst | B60C 29/06 | 152/427 |
| 6,079,519 A * | 6/2000 | Lottes | F16N 21/04 | 137/512.2 |
| 6,929,020 B1 * | 8/2005 | Rogers | F16K 15/20 | 137/232 |
| 7,073,527 B1 * | 7/2006 | Freire Teiga | F16K 17/18 | 137/228 |
| 7,624,752 B2 * | 12/2009 | Huang | F16K 15/207 | 137/228 |
| 8,191,575 B2 * | 6/2012 | Krug, Jr. | F16L 37/30 | 137/15.18 |
| 8,387,650 B1 * | 3/2013 | Hong | F16K 11/02 | 137/224 |
| 8,393,205 B2 * | 3/2013 | Casner | B60C 23/007 | 73/146 |
| 8,833,395 B2 * | 9/2014 | Weng | B60S 5/043 | 137/881 |
| 8,984,937 B1 | 3/2015 | Falkenborg | | |
| 9,701,167 B2 * | 7/2017 | Gosi | B60C 29/02 | |
| 9,937,760 B2 * | 4/2018 | Austin | B60C 29/002 | |
| 10,625,544 B2 * | 4/2020 | Balistreri | B60C 23/00363 | |
| 10,864,783 B2 * | 12/2020 | Balistreri | F16K 15/06 | |
| 10,914,425 B2 * | 2/2021 | Newman | F17C 13/04 | |
| 11,174,959 B2 * | 11/2021 | Arisato | F16K 27/0209 | |
| 2007/0023083 A1 * | 2/2007 | Huang | F16K 15/026 | 137/226 |
| 2008/0115838 A1 * | 5/2008 | Huang | F16K 15/207 | 137/223 |
| 2010/0282333 A1 * | 11/2010 | Newman | F16K 17/168 | 137/115.18 |
| 2013/0269849 A1 * | 10/2013 | Hennig | G05D 7/03 | 152/427 |
| 2021/0402835 A1 * | 12/2021 | Cox | B60C 29/005 | |
| 2023/0220921 A1 * | 7/2023 | Peyton | F16K 24/00 | 137/493.7 |

\* cited by examiner

RAPID-DEFLATE VALVE STEM AND ASSOCIATED SYSTEMS AND METHODS

CROSS REFERENCE TO RELATED APPLICATION

This application claims priority to U.S. Provisional Patent Application No. 63/045,476, titled "RAPID DEFLATE VALVE STEM AND ASSOCIATED SYSTEMS AND METHODS," filed Jun. 29, 2020, the disclosure of which is hereby incorporated by reference in its entirety.

TECHNICAL FIELD

The present disclosure is directed generally to rapid-deflate valve stems and, more particularly, to valve stems having fast-deflation systems for use with tires.

BACKGROUND

Most vehicles with inflatable tires use valve stems to retain gas and control the gas pressure within the tire, allowing adjustment of gas pressure (e.g., air, nitrogen, etc.), depending on the specification and usage. A valve stem is a self-contained valve which selectively opens during inflation or deflation to admit gas to or expel gas from the tire. The valve stem is typically automatically closed when pressure is released from a core and kept sealed by the pressure in the chamber and/or a spring to prevent gas from escaping the tire. Valve stems are commonly used on automobile, motorcycle, and bicycle tires, but can also be used in other applications. Some common conventional valve stem designs include a Schrader valve, an American valve, a Presta valve, a Dunlop valve, and others. Certain valve stem design has been standardized such that the valve stems provide a common port or interface to inflate and deflate the tire mounted on the wheel, such that universal inflation nozzles and/or gauges can be used. In some configurations, tire pressure monitoring systems (TPMS) can be integrated with the valve stem to allow for remote monitoring of tire pressure by a computer of the vehicle.

In some off-road situations with bumpy and/or rocky terrain, a lower gas pressure than would be used under normal conditions can increase compliance of the tire and improve traction. In such situations, a vehicle operator may manually deflate each tire to a desired pressure for optimal traction and performance. Deflation using conventional valve stem designs requires opening of the core by moving the core inward to release gas from the chamber of the tire. The core can be pressed by the operator (e.g., by a finger or object) and the pressure checked at intervals until the desired pressure is reached. This manual process is time-consuming, and the desired pressure target can be missed without careful attention to the pressure during deflation (e.g., by releasing too much gas from the chamber).

DETAILED DESCRIPTION

Figure 1A:
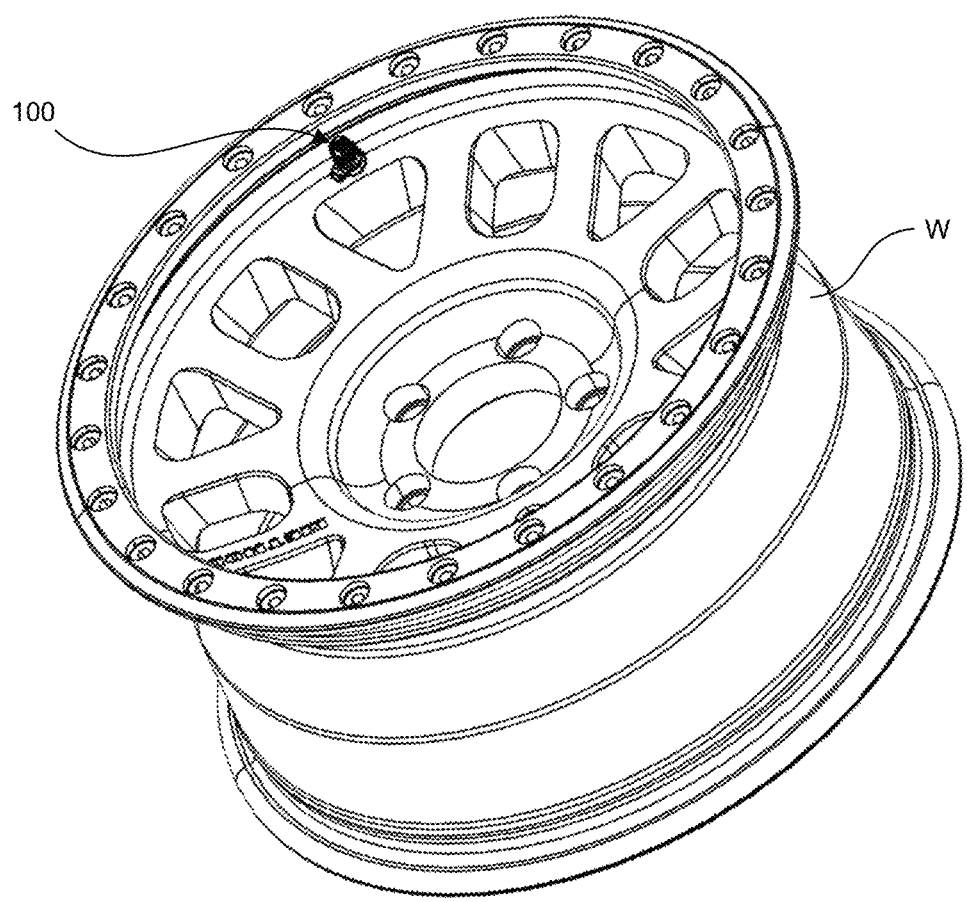
FIGS. 1A-1D are environmental views showing a rapid-deflate valve stem assembly configured in accordance with embodiments of the present technology.

The following disclosure describes various embodiments of rapid-deflate valve stems and associated systems and components for use with inflatable systems, e.g., vehicle tires. In some embodiments, rapid-deflate valve stems configured in accordance with the present technology include high-flowrate deflation components to allow deflation of the inflatable system to a specific gas pressure in a relatively short amount of time. The fast-deflation valve stems may be configured to interface with the wheel of the vehicle using a standardized form factor, e.g., a Schrader valve form factor, so that the fast-deflation valve stems can be installed without modification to the wheel. Fast-deflation valve stems of the present technology may also include TPMS remote sender mounting features.

Conventional valve stems are not designed to provide fast-deflation of a tire and can take up to 15 minutes to deflate to pressures under 20 PSI. In some situations, such as use during off-road use, it may be desirable to deflate the tires to a pressure lower than the standard pressures for on-road use. In this regard, the fast-deflation valve stems of the present technology provide an accurate and repeatable deflation to a specified pressure in a shorter amount of time than deflation of conventional valve stems. The fast-deflation valve stems are configured to release pressure in the tire to a target pressure, such as lower pressures that may be desired for off-road use. In some configurations, the fast-deflation valve stems of the present technology are capable of releasing gas within the tire to the target pressure at about ten times faster, or greater, than release using conventional valve stems.

The fast-deflation valve stems are configured for high flow during controlled deflation while still being compatible with standardized filling components (e.g., Schrader valve filling nozzle compatibility). Toggling of the fast-deflation valve stem can also be configured for greater speed of valve closure to provide accurate pressure setting once the desired pressure is reached in the tire. In some embodiments, an air gage can be applied to the valve stem and remain in place while toggling the valve stem between open and closed positions, allowing real-time tire pressure monitoring while deflation occurs. In other embodiments, the fast-deflation valve stems include a pressure setting system, as will be described in greater detail below, so the valve is automatically closed once the pressure in the tire reaches a desired level. The pressure setting mechanism can be set based on a user preference (e.g., for the terrain, vehicle, tire size, tire model, etc.) or vehicle application (e.g., weight rating, power output, number of driven wheels, etc.) and prevents further deflation of the tire past the set pressure level. The fast-deflation valve stem and other systems of the present technology are suitable for use with any vehicle having inflatable tires.

Certain details are set forth in the following description and in FIGS. 1A-10 to provide a thorough understanding of various embodiments of the present technology. In other instances, well-known structures, systems, materials and/or operations often associated with valve stems and associated components are not shown or described in detail in the following disclosure to avoid unnecessarily obscuring the description of the various embodiments of the technology. Those of ordinary skill in the art will recognize, however, that the present technology can be practiced without one or more of the details set forth herein, or with other structures, methods, components, and so forth. The terminology used below is to be interpreted in its broadest reasonable manner, even though it is being used in conjunction with a detailed description of certain examples of embodiments of the technology. Indeed, certain terms may even be emphasized below; however, any terminology intended to be interpreted in any restricted manner will be overtly and specifically defined as such in this Detailed Description section.

The accompanying Figures depict embodiments of the present technology and are not intended to be limiting of its scope. The sizes of various depicted elements are not necessarily drawn to scale, and these various elements may be arbitrarily enlarged to improve legibility. Component details may be abstracted in the Figures to exclude details such as position of components and certain precise connections between such components when such details are unnecessary for a complete understanding of how to make and use the invention. Additionally, many of the details, dimensions, angles and other features shown in the Figures are merely illustrative of particular embodiments of the disclosure. Accordingly, other embodiments can have other details, dimensions, angles and features without departing from the spirit or scope of the present disclosure. Those of ordinary skill in the art will also appreciate that further embodiments of the invention can be practiced without several of the details described below. In the Figures, identical reference numbers identify identical, or at least generally similar, elements.

Figure 1B:
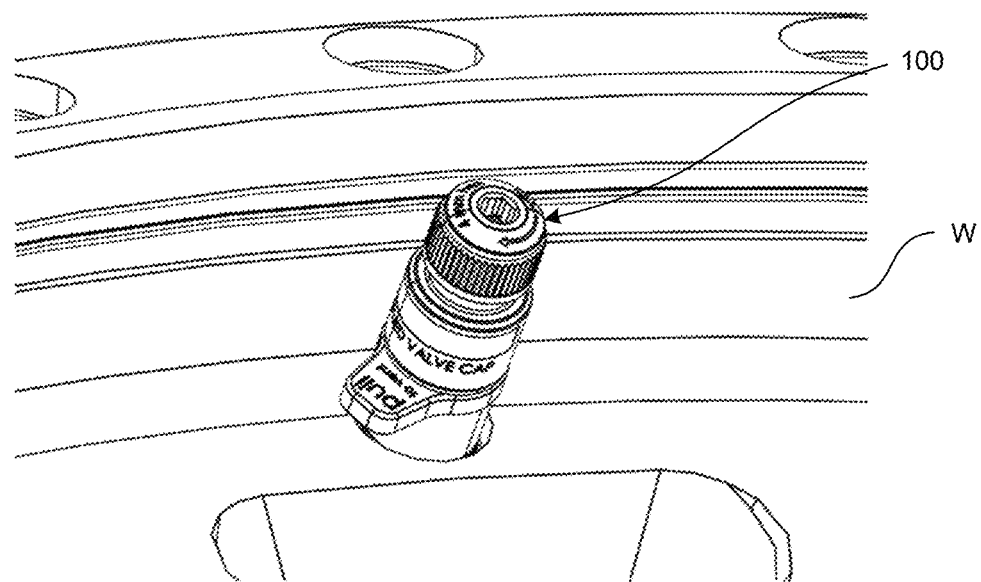
Figure 1C:
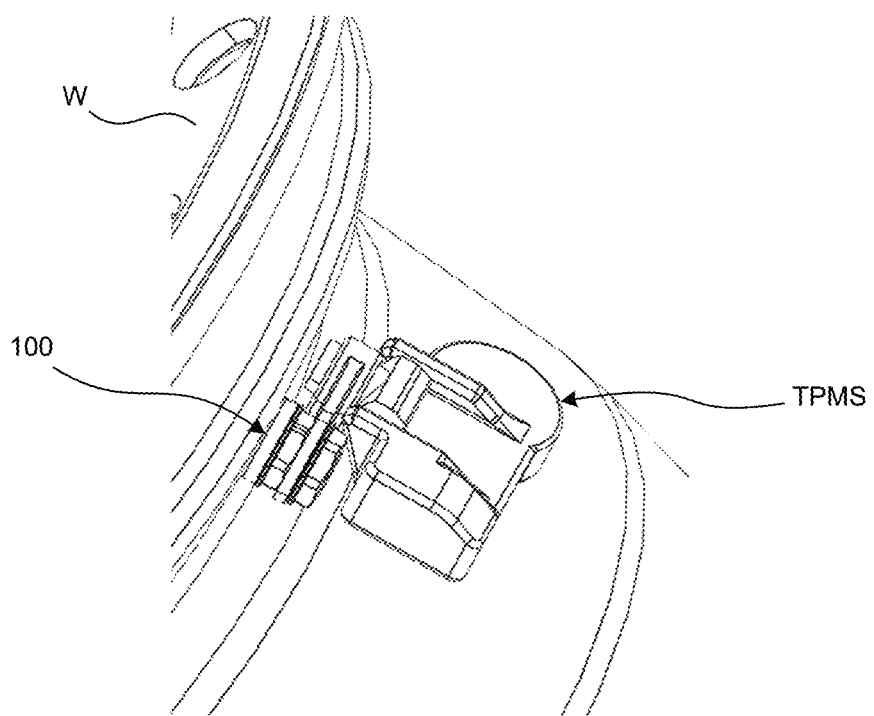
Figure 1D:
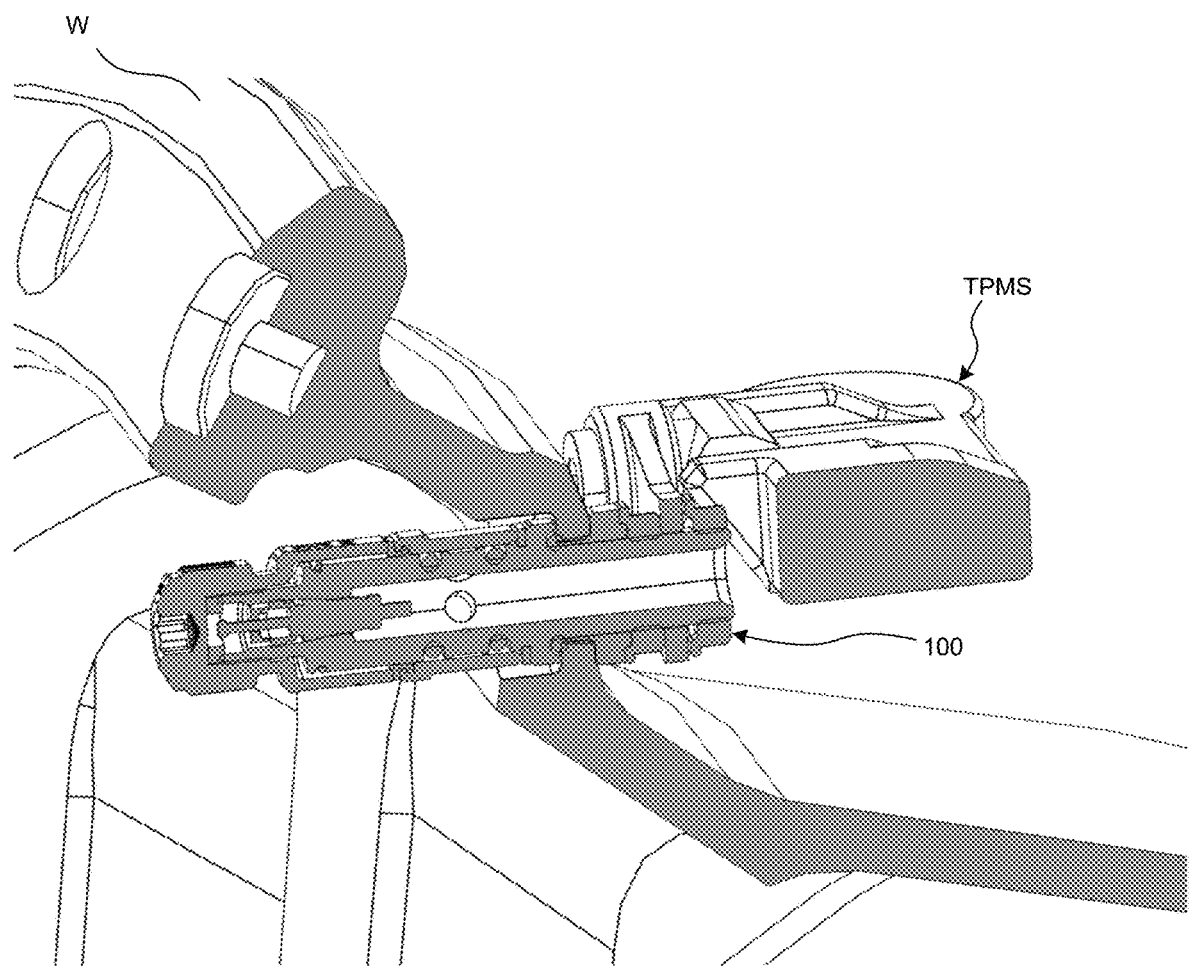

FIGS. 1A-1D are environmental views showing a rapid-deflate valve stem assembly 100 ("valve stem 100") configured in accordance with embodiments of the present technology. As illustrated, the valve stem 100 may be configured for use with a vehicle wheel W in place of a conventional inflation/deflation valve stem. The valve stem 100 includes features for rapid deflation of the gas within the tire (not shown). The valve stem 100 may be mounted to the wheel W such that a portion of the valve stem 100 extends exterior to the pressure surfaces of the wheel W and a portion of the valve stem 100 extends interior to the pressure surfaces of the wheel W, such as shown in FIG. 1B (portion extending exterior to the wheel W) and 1C (portion extending interior to the wheel W). As shown in FIGS. 1C and 1D, the valve stem 100 may optionally be fitted with a TPMS system for monitoring the pressure within the wheel and tire assembly (tire not shown). Embodiments of the valve stem 100 may be configured for use with any gas exchange system.

Figure 2A:
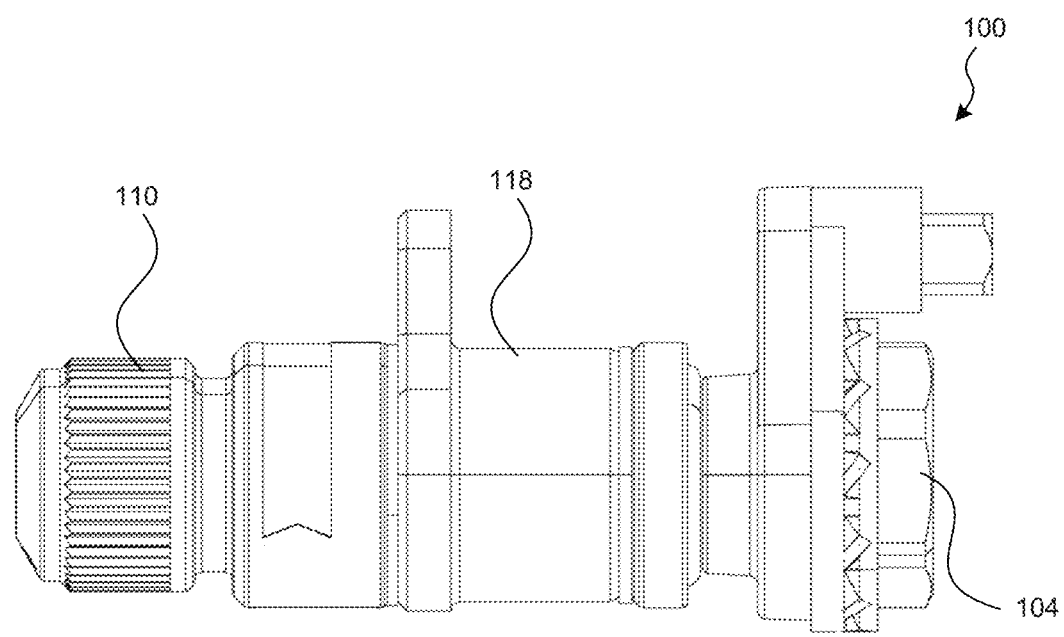
FIGS. 2A and 2B are side and cross-sectional views, respectively, of the valve stem of FIGS. 1A-1D shown in a closed position.
Figure 2B:
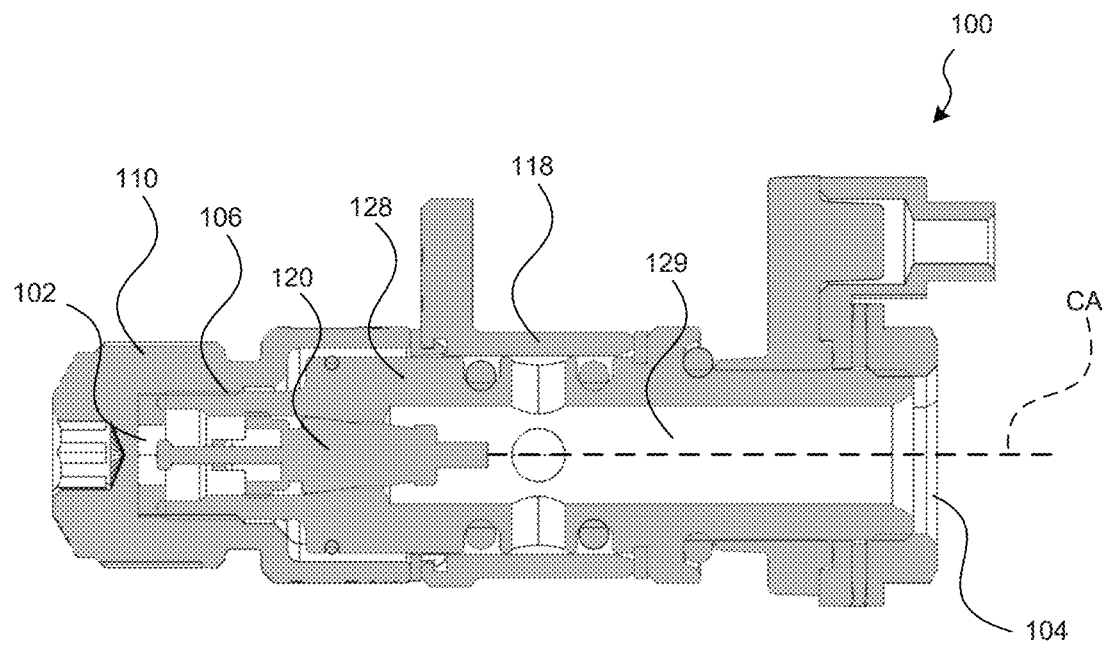

FIGS. 2A and 2B are side and cross-sectional views, respectively, of the valve stem 100 shown in a first, closed position. The valve stem 100 has a proximal end 102, a distal end 104, and is shown with a collar 118 (a "deflation toggle 118") surrounding an intermediate portion of a valve body 128 (a "valve hub 128") in a closed position (with the deflation toggle 118 in the rightmost position in the orientation of FIGS. 2A and 2B) to prevent gas from traveling into or out of the pressure chamber of the wheel and tire assembly. The valve stem 100 includes a dust cap 110 which prevents the deflation toggle 118 from transitioning by axially moving from the closed position (shown in FIGS. 2A and 2B) to a second, open position (see FIGS. 4A-5) such that the wheel and tire assembly is not inadvertently deflated. The dust cap 110 may be fixed to the valve stem 100 with a threaded portion 106 (FIG. 2B), or by any other suitable coupling, e.g., press-fit, friction-fit, twist-to-lock, etc. The valve stem 100 further includes the valve hub 128 having a valve core 120 (e.g., a conventional Schrader valve core) within a central passage 129 of the valve hub 128, the central passage 129 defining a central axis CA.

Figure 3A:
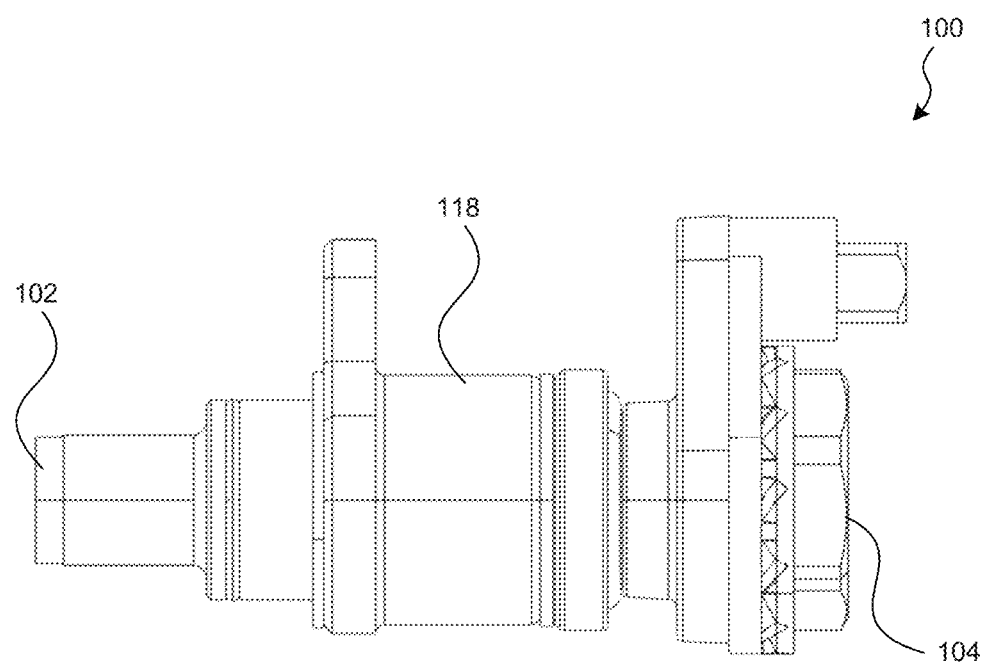
FIGS. 3A and 3B are side and cross-sectional views, respectively, of the valve stem of FIGS. 1A-1D shown with a dust cap removed and the valve stem in the closed position.
Figure 3B:
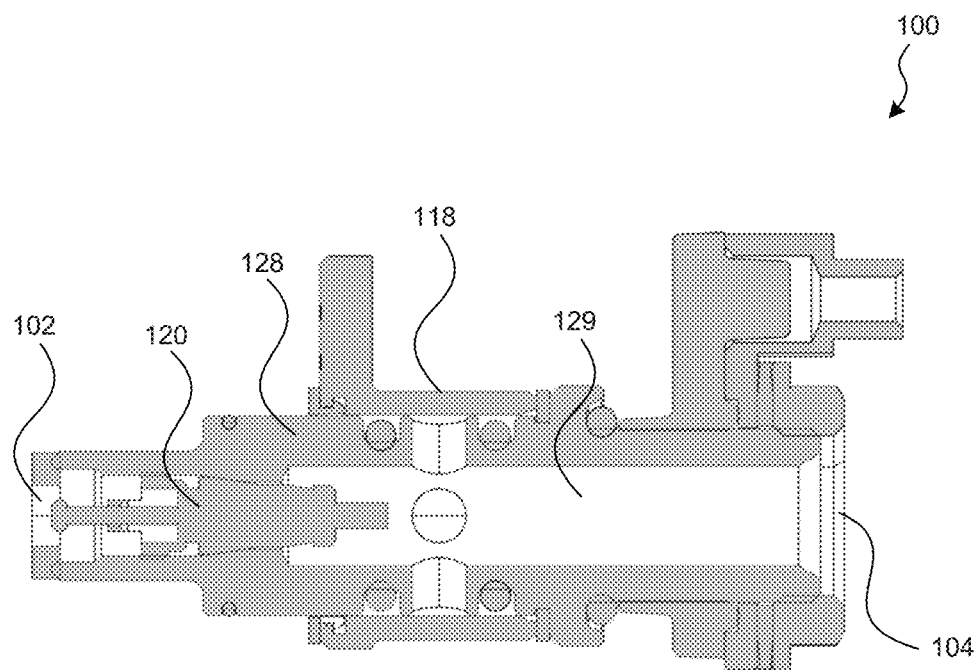

FIGS. 3A and 3B are side and cross-sectional views, respectively, of the valve stem 100 shown with the dust cap 110 removed and the valve stem 100 in the closed position. Removal of the dust cap 110 unlocking the sliding range of motion of the deflation toggle 118, which still remains illustrated in the closed position in FIGS. 3A and 3B. In some embodiments, the dust cap 110 includes a leash portion (not shown) that prevents inadvertent loss of the dust cap 110 when the dust cap 110 is removed from the proximal end 102 of the valve stem 100. The leash may include a tethered strip coupled to the dust cap 110 and the valve stem 100 (e.g., a loop around a portion of the valve stem 100).

Figure 4A:
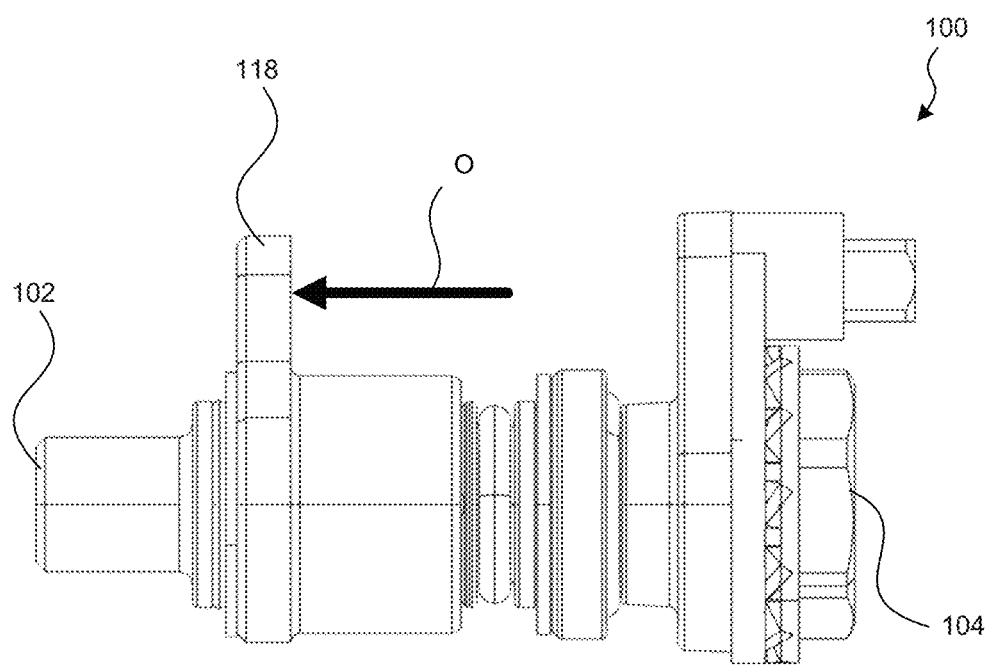
FIGS. 4A and 4B are side and cross-sectional views, respectively, of the valve stem of FIGS. 1A-1D shown with a dust cap removed and the valve stem moved to an open position.
Figure 4B:
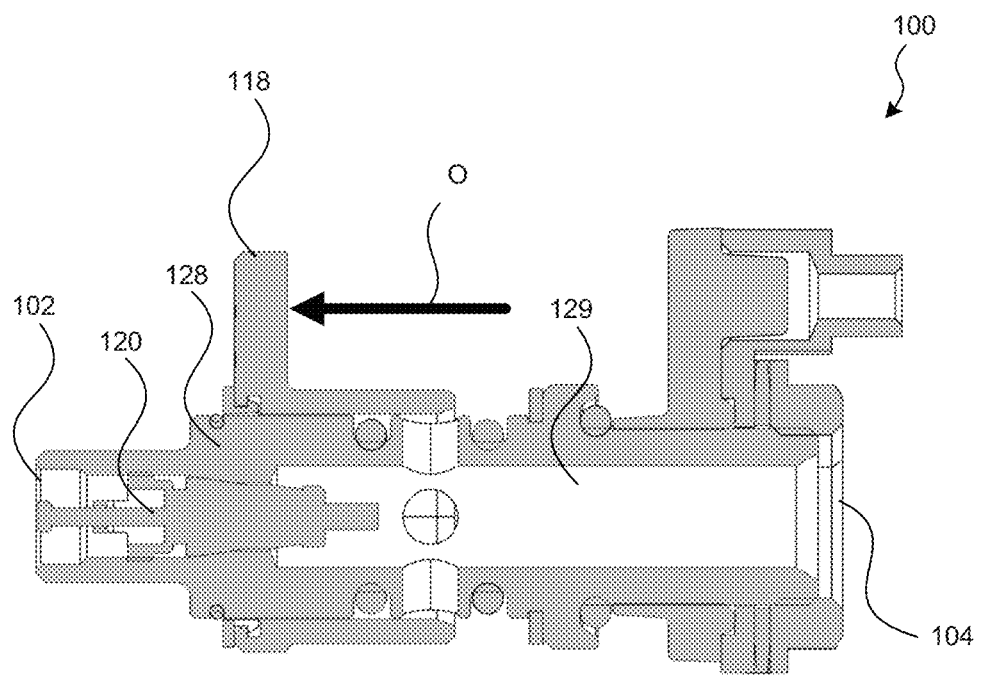

FIGS. 4A and 4B are side and cross-sectional views, respectively, of the valve stem 100 shown with the dust cap 110 removed and the deflation toggle 118 transitioned in the direction of arrow O to the open position (with the deflation toggle 118 in the leftmost position in the orientation of FIGS. 4A and 4B). Moving the deflation toggle 118 to the open position allows escape of gas from the cavity of the wheel and tire assembly, lowering the gas pressure.

Figure 5:
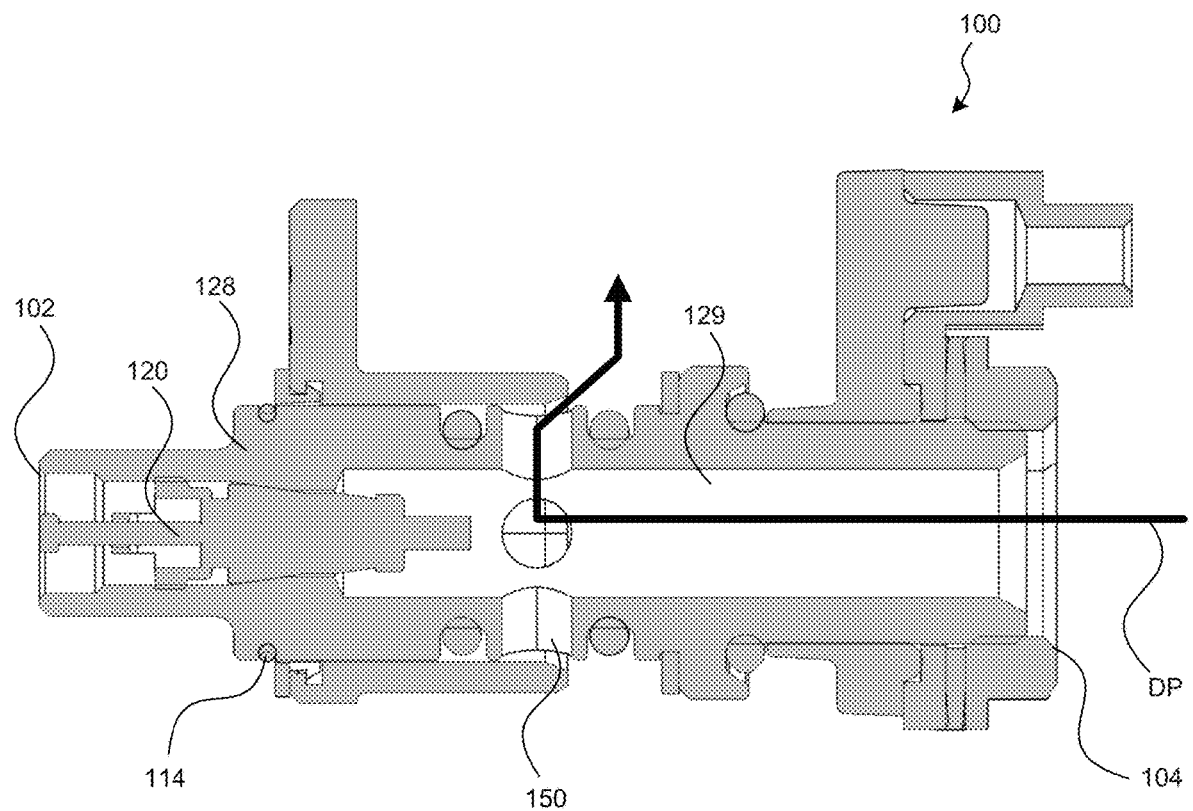
FIG. 5 is a side view of the valve stem of FIGS. 1A-1D showing a representative deflation path of the gas flow from the pressure chamber within the wheel and tire assembly.

FIG. 5 is a side view of the valve stem 100 with the deflation toggle 118 in the open position and showing a representative deflation path DP of the gas flow from the pressure chamber within the wheel and tire assembly to the surrounding exterior atmosphere. The deflation path DP of the valve stem 100 does not travel through the valve core 120, as in typical conventional valve stems, but has an alternate exit path along the deflation path DP through a lateral exit port 150 in communication with the central passage 129 of the valve hub 128 such that deflation of the wheel and tire assembly can be made in a rapid fashion rather than the passageway surrounding the valve core 120. Other deflation paths of the gas flow around the valve core 120 are also within the scope of the present technology.

As shown in FIG. 5, with the dust cap 110 removed from the valve stem 100 and the deflation toggle 118 in the open position, the proximal end 102 of the valve stem 100 remains accessible such that pressure of the wheel and tire assembly can be read during rapid deflation, e.g., using a gauge (not shown) threadedly or otherwise attached to the proximal end 102 of the valve stem 100. A snap ring 114 may be positioned on the valve hub 128 to prevent the deflation toggle 118 from traveling beyond the open position and being removed from the valve hub 128 during transition the open position. To deflate the chamber of the wheel and tire assembly, the deflation toggle 118 is transitioned from the closed position (FIGS. 2A-3B) to the open position (FIGS. 4A-5), allowing gas to flow along deflation path DP and vent to the surrounding atmosphere. In the configuration shown in FIGS. 1A-7, the deflation of the wheel and tire assembly can be manually stopped by transitioning the deflation toggle 118 from the open position to the closed position when the desired pressure is reached. In further embodiments, as will be explained in greater detail below with reference to FIGS. 8A-10, an automated shut off valve ("pressure set assembly 200") can be assembled to the valve stem 100 to automatically stop the deflation when a set pressure within the wheel and tire assembly is reached.

Figure 6:
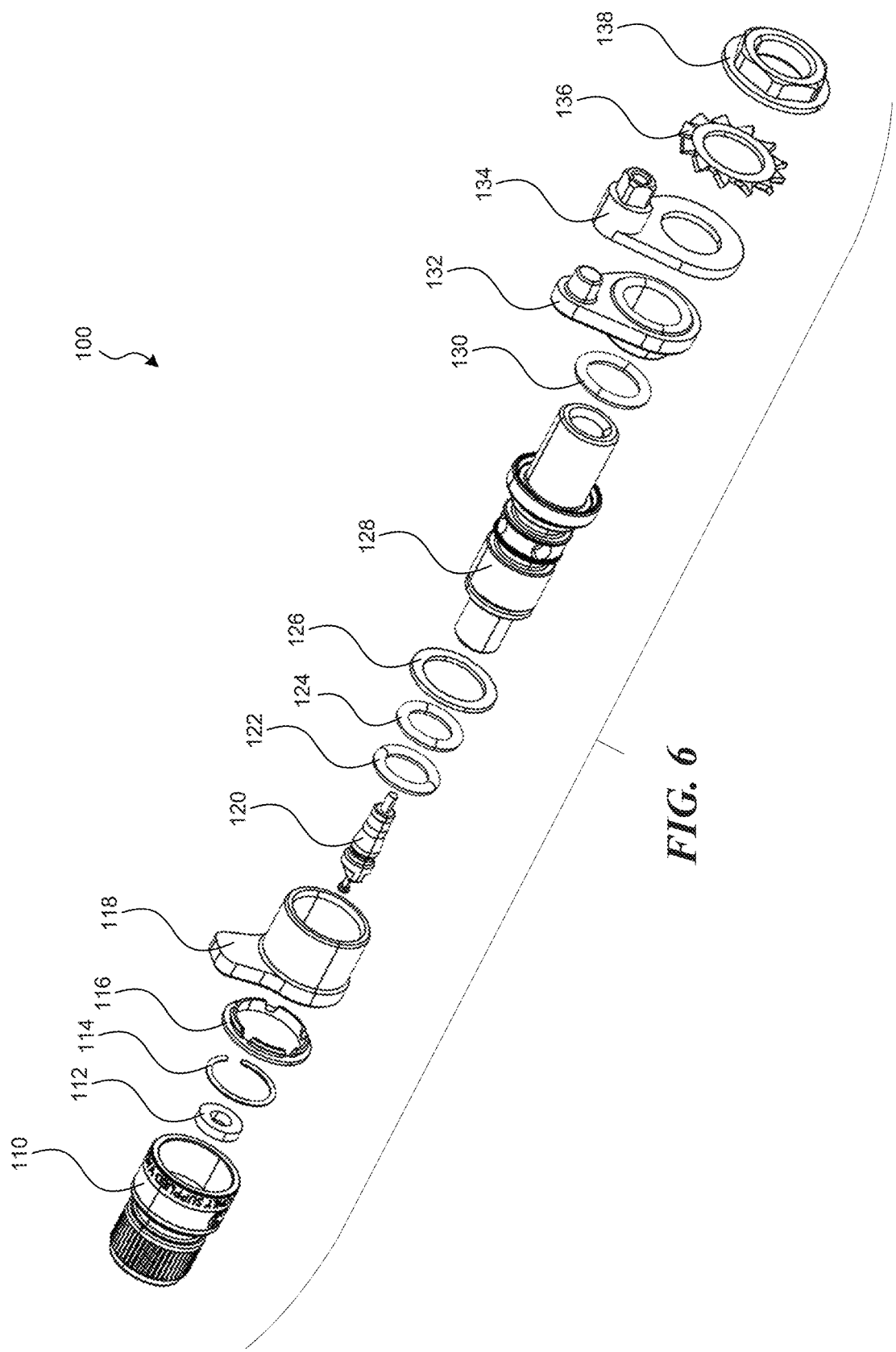
FIG. 6 is an exploded view of the valve stem of FIGS. 1A-1D.

FIG. 6 is an exploded view of the valve stem 100. The illustrated embodiment of the valve stem 100 includes the dust cap 110, a first seal 112, the snap ring 114, a second seal 116, the deflation toggle 118, the valve core 120, a proximal primary seal 122 (a "third seal 122"), a distal primary seal 124 (a "fourth seal 124"), a fifth seal 126, the valve hub 128, a sixth seal 130 on an interface portion of the valve hub 128, a shaped valve seal 132, an anti-rotation TPMS fixture 134, a lock washer 136, and a nut 138.

Assembly of the valve stem 100 will now be described in greater detail with reference to FIG. 6. During assembly, the valve core 120 (e.g., a conventional Schrader valve core, or other suitable valve core) is threaded into the valve hub 128 and torqued to a specification (e.g., 3-5 in-lbs.). Next, the third, fourth, fifth, and sixth seals 122, 124, 126, and 130 are installed on the valve hub 128 (e.g., in corresponding grooves of the valve hub 128) to provide sealing between various surfaces of the valve stem 100, as will be described below with reference to FIG. 7.

Next, the second seal 116 is inserted into and fixed to the deflation toggle 118 toward the proximal end 102. If applicable, an end of the leash (not shown) is fitted around the deflation toggle 118 on an end to provide an anchor point for the leash. The deflation toggle 118, the second seal 116, and the leash are assembled to the valve hub 128, with the deflation toggle 118 interfacing the third, fourth, and fifth seals 122, 124, and 126. Next, the snap ring 114 is assembled to the valve hub 129 to prevent travel of the deflation toggle 118 farther toward the proximal end 102 than the open position (FIGS. 4A-5).

Next, the first seal 112 is inserted into the dust cap 110 to provide a seal against a surface of the valve hub 128 at the proximal end 102. The dust cap 110 is then threaded (or other suitable attachment) onto the valve hub 128 until the dust cap 110 interfaces the deflation toggle 118 to prevent transition of the deflation toggle 118 from the closed position to the open position on the valve hub 128. The leash is optional and may be fitted around the dust cap 110 to prevent inadvertent loss of the dust cap 110 when it is removed from the valve stem 100 during deflation/inflation.

Finally, an interface portion of the assembly is inserted into a port of the wheel (see, e.g., FIG. 1D) and the shaped valve seal 132, the anti-rotation TPMS fixture 134, the lock washer 136, and the nut 138 are assembled to the distal end 104 of the valve hub 128 on the other side of the port of the wheel. The nut 138 may be threaded to a specified torque to retain the valve stem 100 on the wheel during use. In other embodiments, the shaped valve seal 132 and the anti-rotation TPMS fixture 134 are omitted and may be replaced with suitable washers to allow the valve stem 100 to attach to the wheel W in situations where TPMS is not needed.

Figure 7:
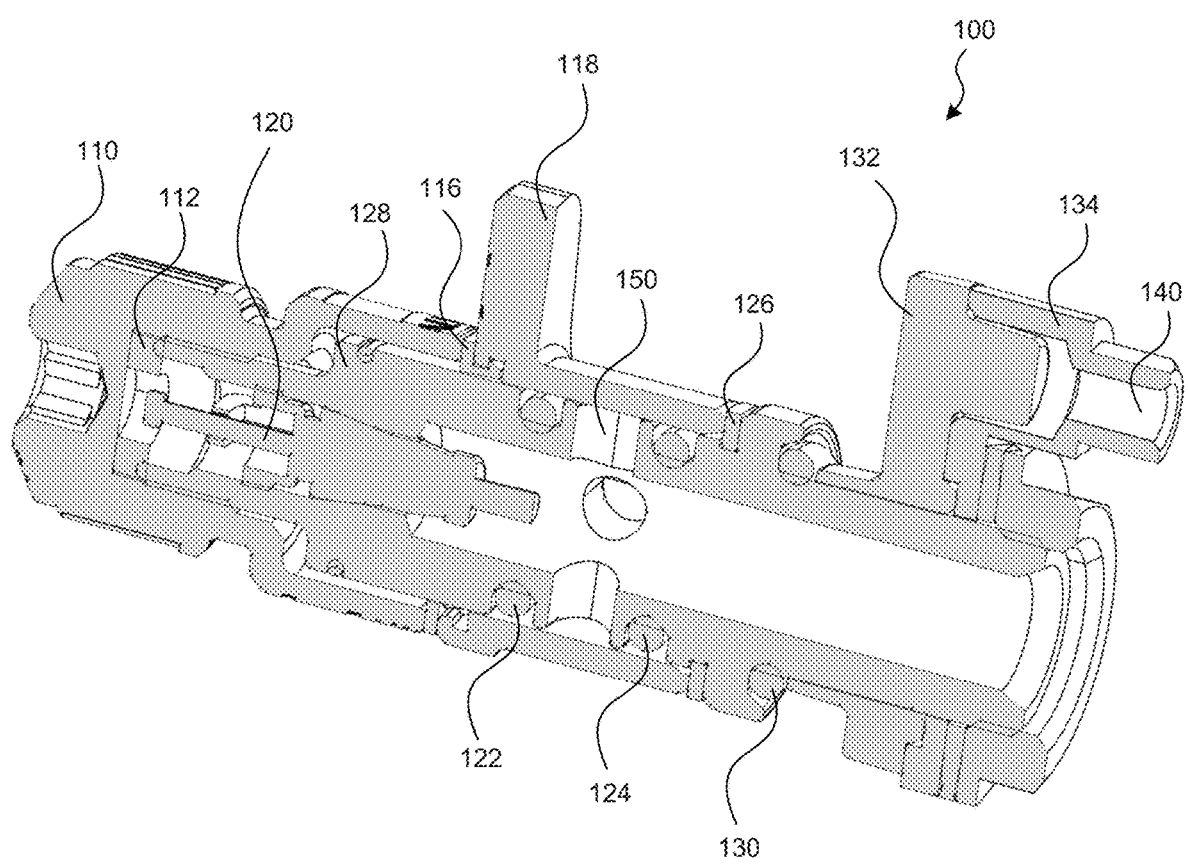
FIG. 7 is a perspective view of the valve stem of FIGS. 1A-1D showing a sealing configuration.

FIG. 7 is a perspective view of the valve stem 100 showing a sealing configuration, which will now be explained in greater detail. In these embodiments, certain of the seals are redundant to provide a sealing configuration when one or more of the seals has failed, which may be useful in high contamination conditions, e.g., for use with off-road vehicles. As such, certain of the seals are primary, directly sealing the gas in the wheel and tire assembly, in certain of the seals are secondary, indirectly sealing the gas in the wheel and tire assembly until a seal failure of another seal occurs, and/or preventing contaminant ingress to the inner portions of the valve stem 100. The first seal 112 is secondary and configured to seal between the dust cap 110 and the proximal end 102 of the valve hub 128, e.g., to prevent ingress of contaminants to the valve core 120. The valve core 120 includes a primary seal (not shown) positioned between the surfaces of the valve core 120 and the valve hub 128 to prevent gas from traveling past the valve core 120. The second seal 116 is secondary and configured to seal between the dust cap 110, the valve hub 128, and the deflation toggle 118 to prevent ingress of contaminants past the interface of the dust cap 110 and the deflation toggle 118. The third seal 122 is primary and configured to seal between the deflation toggle 118 and the valve hub 128 proximal to the lateral exit port 150. The fourth seal 124 is primary and configured to seal between the deflation toggle 118 and the valve hub 128 distal to the lateral exit port 150. The fifth seal 126 is secondary and configured to seal between the deflation toggle 118 and the valve hub 128 to prevent ingress of contaminants past the interface of the deflation toggle 118 in the valve hub 128 on the distal side of the lateral exit port 150. The sixth seal 130 is secondary and configured to seal between the valve hub 128 and a surface of the wheel W surrounding the wheel port. Finally, the shaped valve seal 132 is primary and configured to seal between the anti-rotation TPMS fixture 134 and a surface of the wheel (see FIG. 11)) surrounding the wheel port.

With the dust cap 110 coupled to the valve hub 128 (e.g., with threads 106), the dust cap 110 abuts the deflation toggle 118. As the dust cap 110 is further tightened, the interface of the dust cap 110 and the deflation toggle 118 provides a compression on the secondary seals (the first, second, and fifth seals, 112, 116, and 126), preventing ingress of contaminants past the exterior facing components of the valve stem 100, i.e., the interfaces between the dust cap 110, the deflation toggle 118, and the valve hub 128. On the distal end 104 of the valve stem 100, the nut 138 provides compression of the shaped valve seal 132 against the surface of the wheel to create the seal, and further may prevent rotation of the valve stem 100 with respect to the wheel W. The anti-rotation TPMS fixture 134 includes a TPMS mounting port 140 to optionally attach a TPMS sensor, and may also include a seal.

Figure 8A:
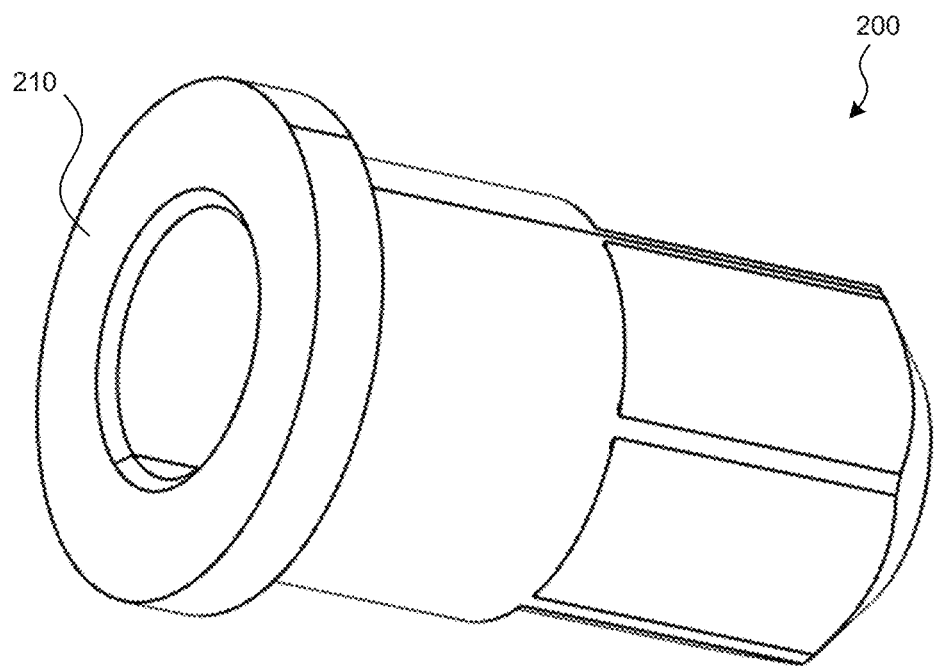
FIGS. 8A-8C are perspective, cross-sectional, and exploded views, respectively, showing a pressure set assembly configured for use with the valve stem of FIGS. 1A-1D.
Figure 8B:
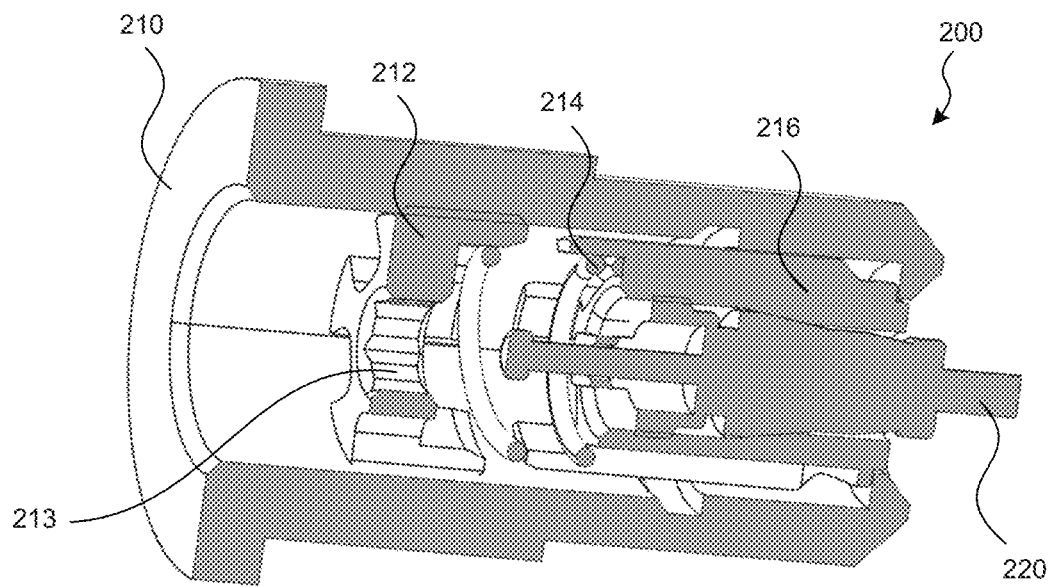
Figure 8C:
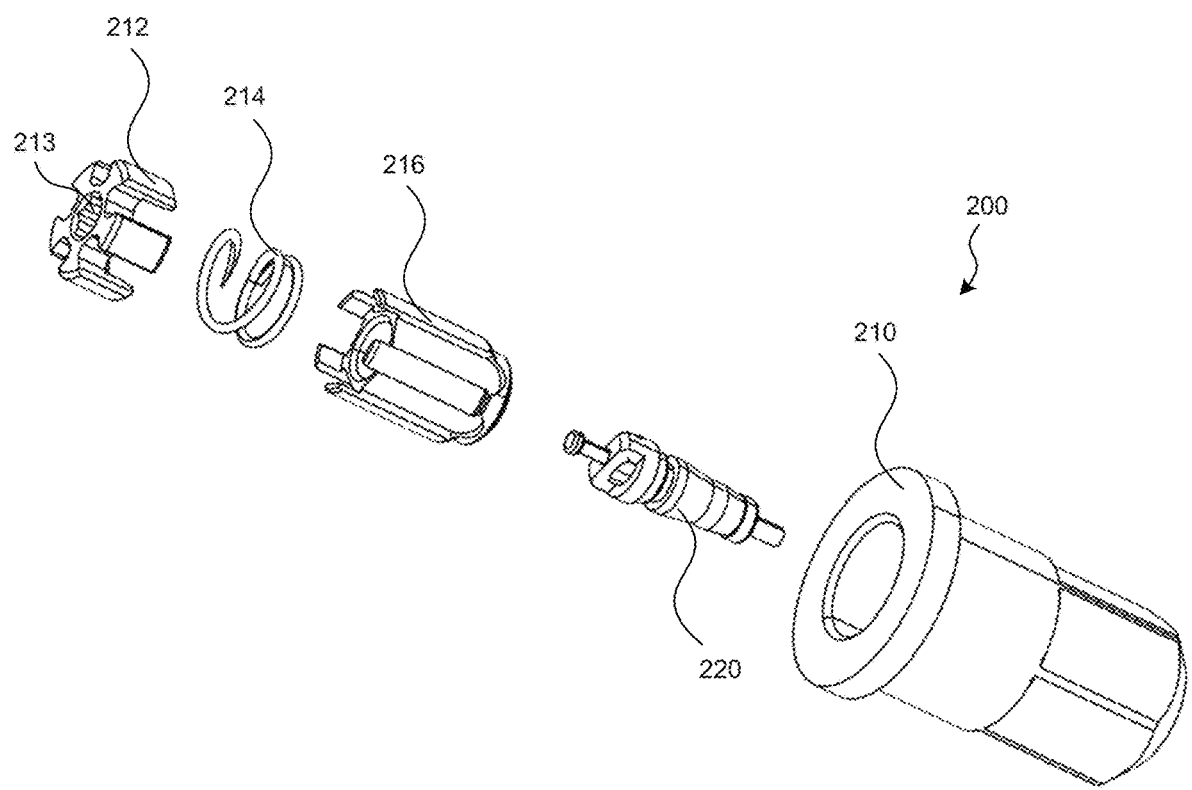

FIGS. 8A-8C are perspective, cross-sectional, and exploded views, respectively, showing a pressure set assembly 200 configured for use with the valve stem 100. The pressure set assembly 200 may be optionally threaded to the valve hub 128 of the valve stem 100 at the distal end 104 by replacing the nut 138 with the pressure set assembly 200. As shown in FIGS. 8B and 8C, the pressure set assembly 200 includes a housing 210, a pressure set portion 212 (a "pressure set screw 212") having drive recess 213 (e.g., hex, TORX®, etc.), a pressure set poppet spring 214, a valve set portion 216 (a "poppet valve set 216"), and a secondary valve core 220 (e.g., a conventional Schrader valve core) configured as a check valve. During inflation of the tire, the pressure entering the proximal end 102 of the valve stem 100 overcomes a spring pressure of the secondary valve core 220, allowing gas to flow into the chamber within the wheel and tire assembly. During inflation, the poppet valve set 216 remains in a sealed position as shown in FIG. 8B.

Figure 9A:
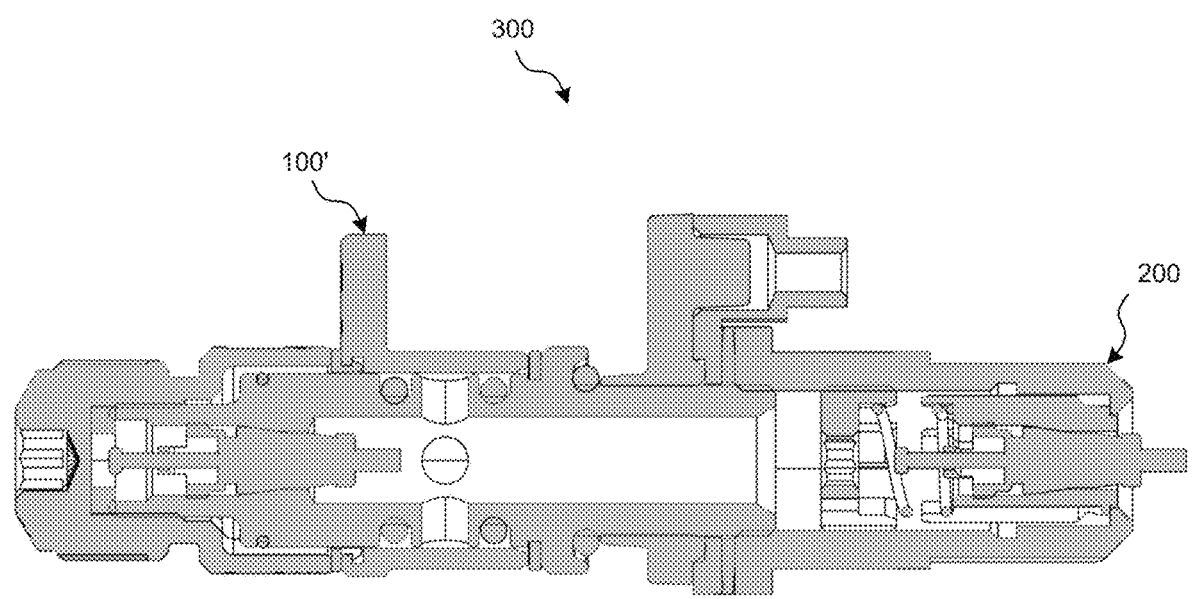
FIGS. 9A and 9B are side cross-sectional views of an assembly of the valve stem of FIGS. 1A-1D and the pressure set assembly of FIGS. 8A-8C, with FIG. 9B showing a representative deflation path of the gas flow from the pressure chamber within the wheel and tire assembly.
Figure 9B:
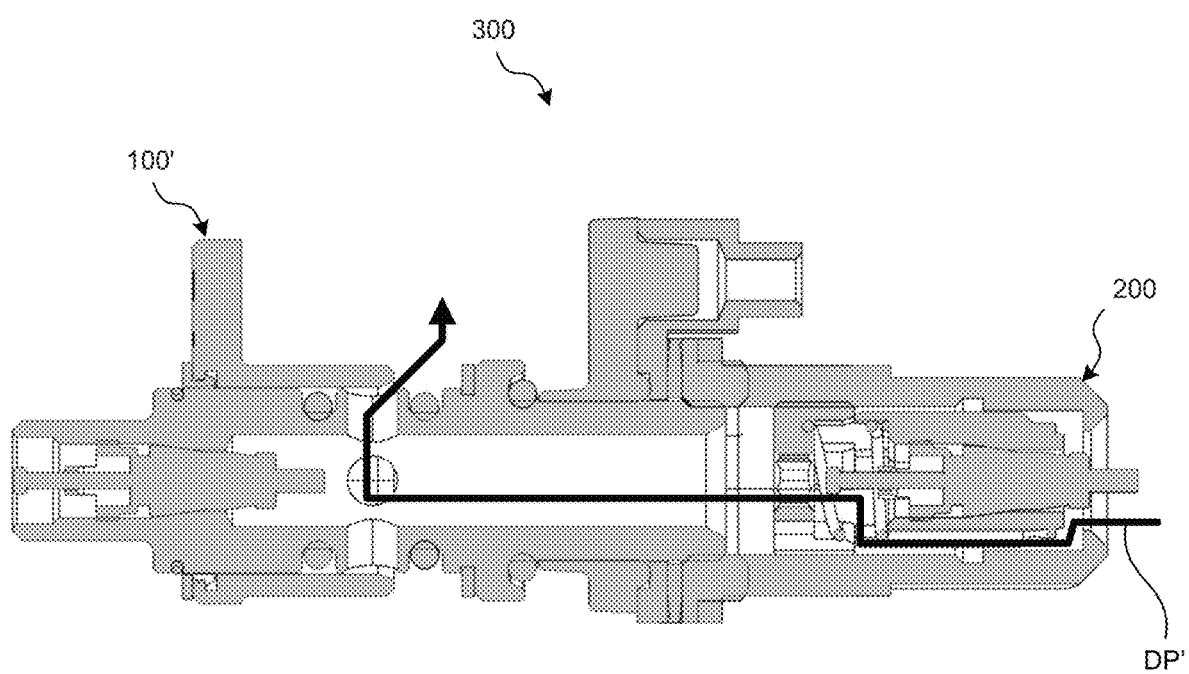

FIGS. 9A and 9B are side cross-sectional views of an assembly 300 of the valve stem 100 and the pressure set assembly 200, with FIG. 9B showing a representative deflation path DP' of the gas flow from the pressure chamber within the wheel and tire assembly when the pressure set assembly 200 is fitted to the valve stem 100. When the deflation toggle 118 is in the open position, a pressure differential is created between the chamber of the wheel and tire assembly and the atmosphere. Until the predetermined pressure within the chamber is reached, the poppet valve set 216 opens by compressing the pressure set poppet spring 214, allowing gas to escape and deflate the wheel and tire assembly. Once the predetermined pressure within the chamber is reached, the poppet valve set 216 closes to stop the flow of gas along the deflation path DP' through the assembly 300. Once gas flow has stopped by closure of the poppet valve set 216, the deflation toggle 118 can be transitioned to the closed position and the dust cap 110 can be replaced on the valve stem 100, sealing the system 300 and preventing ingress of contaminants.

Figure 10:
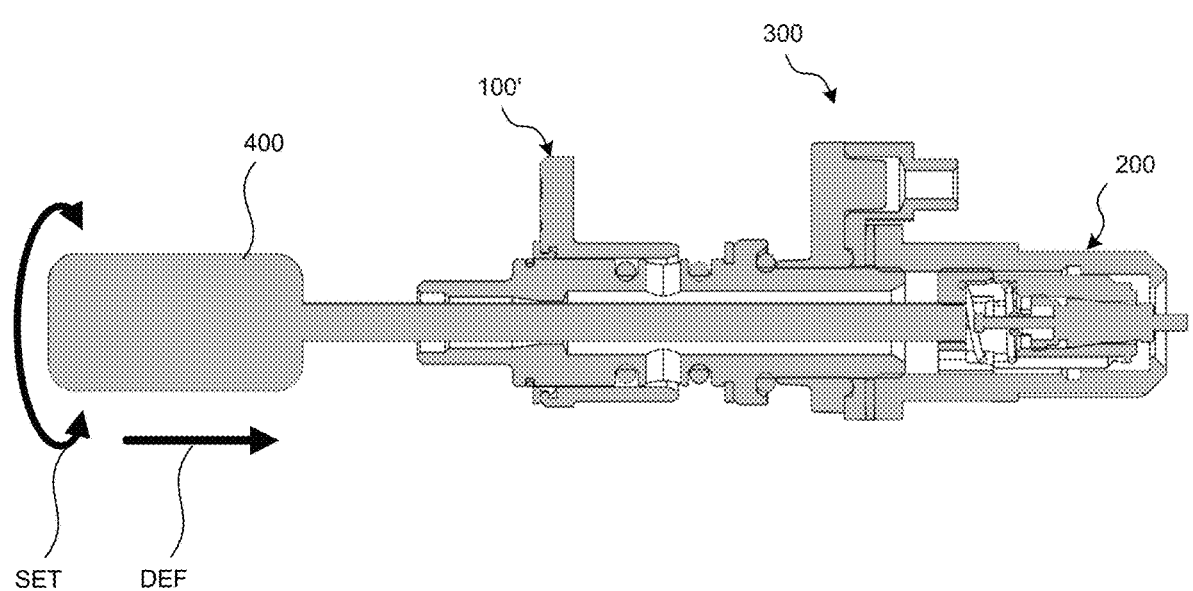
FIG. 10 shows a representative embodiment of a tool configured to adjust the set pressure of the pressure set assembly of FIGS. 8A-8C through the valve stem of FIGS. 1A-1D.

FIG. 10 shows a representative embodiment of a tool 400 that can be used adjust the set pressure of the pressure set assembly 200 through the valve stem 100 such that the predetermined pressure at which the poppet valve set 216 will close can be adjusted. The tool 400 can be inserted into the valve stem 100 by removing the valve core 120 from the valve hub 128 and engaging the tool 400 with the drive recess 213 of the pressure set screw 212. Rotating the tool 400 in the direction SET rotates the pressure set screw 212 and adjusts the set pressure of the pressure set assembly 200. In some embodiments, the tool 400 can be rotated clockwise to increase the set pressure and rotated counterclockwise to decrease the set pressure, or vice versa. Once the set pressure is set, the valve core 120 can be replaced to prevent exit of gas within the wheel and tire assembly as the chamber is fined. In embodiments with the pressure set assembly 200 attached to the valve stem 100, use of the tool 400 may be necessary to completely deflate the wheel and tire assembly. In this regard, the tool 400 can be inserted in the direction DEF to compress the secondary valve core 220 and allow complete deflation of the wheel and tire assembly until the pressure in the chamber of the wheel and tire assembly is equal to the atmospheric pressure.

Although embodiments are shown for use with an automotive wheel and tire configuration for purposes of the present disclosure, the rapid-deflate valve stem assemblies described herein can be used with any suitable type of gas system, e.g., wheels and tires on other types of vehicles, other gas valve uses, gas-filled suspension components, etc. Accordingly, the various embodiments of the present technology described herein are not limited to use with a particular configuration.

References throughout the foregoing description to features, advantages, or similar language do not imply that all of the features and advantages that may be realized with the present technology should be or are in any single embodiment of the invention. Rather, language referring to the features and advantages is understood to mean that a specific feature, advantage, or characteristic described in connection with an embodiment is included in at least one embodiment of the present technology. Thus, discussion of the features and advantages, and similar language, throughout this specification may, but do not necessarily, refer to the same embodiment. Furthermore, the described features, advantages, and characteristics of the present technology may be combined in any suitable manner in one or more embodiments. One skilled in the relevant art will recognize that the present technology can be practiced without one or more of the specific features or advantages of a particular embodiment. In other instances, additional features and advantages may be recognized in certain embodiments that may not be present in all embodiments of the present technology.

Any patents and applications and other references noted above, including any that may be listed in accompanying filing papers, are incorporated herein by reference. Aspects of the invention can be modified, if necessary, to employ the systems, functions, and concepts of the various references described above to provide yet further implementations of the invention.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof means any connection or coupling, either direct or indirect, between two or more elements; the coupling or connection between the elements can be physical, for fluid (e.g., air) transfer, logical, or a combination thereof. Additionally, the words "herein," "above," "below," and words of similar import, when used in this application, refer to this application as a whole and not to any particular portions of this application. Where the context permits, words in the above Detailed Description using the singular or plural number may also include the plural or singular number respectively. The word "or," in reference to a list of two or more items, covers all of the following interpretations of the word: any of the items in the list, all of the items in the list, and any combination of the items in the list.

The above Detailed Description of examples and embodiments of the invention is not intended to be exhaustive or to limit the invention to the precise form disclosed above. While specific examples for the invention are described above for illustrative purposes, various equivalent modifications are possible within the scope of the invention, as those skilled in the relevant art will recognize. The teachings of the invention provided herein can be applied to other systems, not necessarily the system described above. The elements and acts of the various examples described above can be combined to provide further implementations of the invention. Some alternative implementations of the invention may include not only additional elements to those implementations noted above, but also may include fewer elements. Further any specific numbers noted herein are only examples: alternative implementations may employ differing values or ranges.

While the above description describes various embodiments of the invention and the best mode contemplated, regardless how detailed the above text, the invention can be practiced in many ways. Details of the system may vary considerably in its specific implementation, while still being encompassed by the present disclosure. As noted above, particular terminology used when describing certain features or aspects of the invention should not be taken to imply that the terminology is being redefined herein to be restricted to any specific characteristics, features, or aspects of the invention with which that terminology is associated. In general, the terms used in the following claims should not be construed to limit the invention to the specific examples disclosed in the specification, unless the above Detailed Description section explicitly defines such terms. Accordingly, the actual scope of the invention encompasses not only the disclosed examples, but also all equivalent ways of practicing or implementing the invention under the claims. From the foregoing, it will be appreciated that specific embodiments of the invention have been described herein for purposes of illustration, but that various modifications may be made without deviating from the spirit and scope of the various embodiments of the invention. Accordingly, the invention is not limited, except as by the appended claims.

Although certain aspects of the invention are presented below in certain claim forms, the applicant contemplates the various aspects of the invention in any number of claim forms. Accordingly, the applicant reserves the right to pursue additional claims after filing this application to pursue such additional claim forms, in either this application or in a continuing application.

I claim:

1. A valve stem, comprising:
    a valve body having—
        a central passage extending through the valve body from a proximal end to a distal end;
        a lateral port positioned between the proximal end and the distal end and extending through the valve body into the central passage;
        a first primary seal fixed with respect to the valve body and positioned adjacent to the lateral port toward the proximal end; and
        a second primary seal fixed with respect to the valve body and positioned adjacent to the lateral port toward the distal end;
    a valve core positioned within the central passage near the proximal end and configured to selectively permit gas flow from the proximal end into the central passage past the valve core; and
    a collar surrounding an intermediate portion of the valve body, the collar slidable with respect to the valve body between a first position and a second position, wherein,
        when moved to the first position, the collar contacts the first and second primary seals and occludes the lateral port to prohibit gas flow from the distal end through the central passage and out of the lateral port, and
        when moved to the second position, the collar contacts the first primary seal and is separated from the second primary seal to at least partially open the lateral port to permit gas flow from the distal end through central passage and out of the lateral port.

2. The valve stem of claim 1, wherein the central passage defines a central axis, and wherein the collar is slidable along the central axis with respect to the valve body between the first and second positions.

3. The valve stem of claim 2, further comprising a proximal secondary seal positioned between a proximal end of the collar and the valve body wherein the proximal secondary seal is fixed with respect to the collar such that the proximal secondary seal moves along the valve body as the collar slides between the first and second positions, and wherein the proximal secondary seal is configured to wipe contaminants toward the proximal end as the collar moves from the first position to the second position.

4. The valve stem of claim 3, further comprising a distal secondary seal positioned between a distal end of the collar and the valve body, wherein the distal secondary seal is fixed with respect to the valve body and contacts the distal end of the collar when the collar is in the first position, and wherein the distal secondary seal is configured to prohibit contaminant ingress to the second primary seal.

5. The valve stem of claim 1, wherein the valve core is configured to prohibit gas flow from the central passage past the valve core.

6. The valve stem of claim 1, wherein the valve body further comprises an interface portion positioned near the distal end, and wherein the interface portion is configured to extend through a port of a wheel to permit fluid communication between a pressure chamber of the wheel and the central passage.

7. The valve stem of claim 6, further comprising:
    a valve seal positioned on the interface portion of the valve body between the distal end and the lateral port, wherein the valve seal is configured to prohibit gas flow from the pressure chamber of the wheel through the port of the wheel past the valve body; and
    a fastener couplable to the distal end of the valve body within the pressure chamber of the wheel and configured to removably attach the valve stem to the wheel.

8. The valve stem of claim 7, further comprising a fixture positioned between the valve seal and the fastener, wherein the fixture has a mounting port configured to interface with a tire pressure monitoring system (TPMS) remote sender.

9. The valve stem of claim 1, further comprising a cap couplable to the proximal end of the valve body, wherein, when the cap is in an installed position, the cap is configured to occlude the central passage at the proximal end and prevent contaminant ingress to the valve core, and wherein the cap interfaces with the collar when the cap is in the installed position to prevent the collar from moving away from the first position toward the second position.

10. A valve stem, comprising:
    a valve body having:
        a central passage extending through the valve body from a proximal end to a distal end; and
        a lateral port positioned between the proximal end and the distal end and extending through the valve body into the central passage;
    a pressure set assembly couplable to the distal end of the valve body, the pressure set assembly having:
        a housing having a central pressure set passage extending from a proximal end to a distal end of the housing in communication with the central passage of the valve body;
        a valve set portion positioned within the central pressure set passage near the distal end, the valve set portion having an aperture with a secondary check valve core positioned therein;
        a pressure set portion positioned within the central pressure set passage between the proximal end and the valve set portion; and
        a pressure set spring positioned between the pressure set portion and the valve set portion, wherein the pressure set spring biases the valve set portion against the housing to selectively prohibit gas flow from the distal end of the housing through the central pressure set passage; and
    a collar surrounding an intermediate portion of the valve body, the collar slidable with respect to the valve body between a first position and a second position;
    a primary seal fixed with respect to the valve body and positioned adjacent to the lateral port toward the proximal end; and
    a proximal secondary seal positioned between a proximal end of the collar and the valve body, wherein the proximal secondary seal is fixed with respect to the collar such that the proximal secondary seal moves along the valve body as the collar slides between the first and second positions, and wherein the proximal secondary seal is configured to wipe contaminants toward the proximal end as the collar moves from the first position to the second position, wherein,
when moved to the first position, the collar contacts the primary seal and occludes the lateral port to prohibit gas flow from the central pressure set passage through the central passage and out of the lateral port, and when moved to the second position, the collar at least partially opens the lateral port to permit gas flow from the central pressure set passage through central passage and out of the lateral port.

11. The valve stem of claim 10, further comprising a valve core positioned within the central passage near the proximal end of the valve body and configured to selectively permit gas flow from the proximal end into the central passage past the valve core.

12. The valve stem of claim 10, wherein—
the pressure set portion is threadedly coupled to the housing within the central pressure set passage,
the pressure set portion further comprises a drive recess configured to receive a tool therein to rotate the pressure set portion with respect to the housing,
rotation of the pressure set portion in a first direction translates the pressure set portion axially with respect to the housing and reduces the distance between the pressure set portion and the valve set portion, compressing the pressure set spring to increase a set pressure at which the valve set portion moves within the central pressure set passage to permit gas flow through the central pressure set passage, and
rotation of the pressure set portion in a second direction translates the pressure set portion axially with respect to the housing and increases the distance between the pressure set portion and the valve set portion, extending the pressure set spring to reduce the set pressure.

13. The valve stem of claim 10, wherein the primary seal is a first primary seal, the valve stem further comprising
a second primary seal fixed with respect to the valve body and positioned between the distal end and the lateral port,
wherein the first and second primary seals are configured to interface with an inner surface of the collar to prohibit gas flow from the distal end through the central passage and out of the lateral port, and
wherein, when moved to the second position, the collar contacts the first primary seal and is separated from the second primary seal to at least partially open the lateral port.

14. The valve stem of claim 10, wherein the valve body further comprises an interface portion positioned near the distal end between the lateral port and the pressure set assembly, and wherein the interface portion is configured to extend through a port of a wheel to permit fluid communication between a pressure chamber of the wheel and the central passage.

15. The valve stem of claim 14, further comprising:
a valve seal positioned on the interface portion of the valve body between the lateral port and the pressure set assembly, wherein the valve seal is configured to prohibit gas flow from the pressure chamber of the wheel through the port of the wheel past the valve body,
wherein the pressure set assembly is threadedly couplable to the valve body and configured to removably attach the valve stem assembly to the wheel.

16. The valve stem of claim 13, further comprising a distal secondary seal positioned between a distal end of the collar and the valve body, wherein the distal secondary seal is fixed with respect to the valve body and contacts the distal end of the collar when the collar is in the first position, and wherein the distal secondary seal is configured to prohibit contaminant ingress to the second primary seal.

* * * * *